(No Model.)
J. KELLER.
TILTING DEVICE FOR HARVESTERS.
No. 360,226. Patented Mar. 29, 1887.
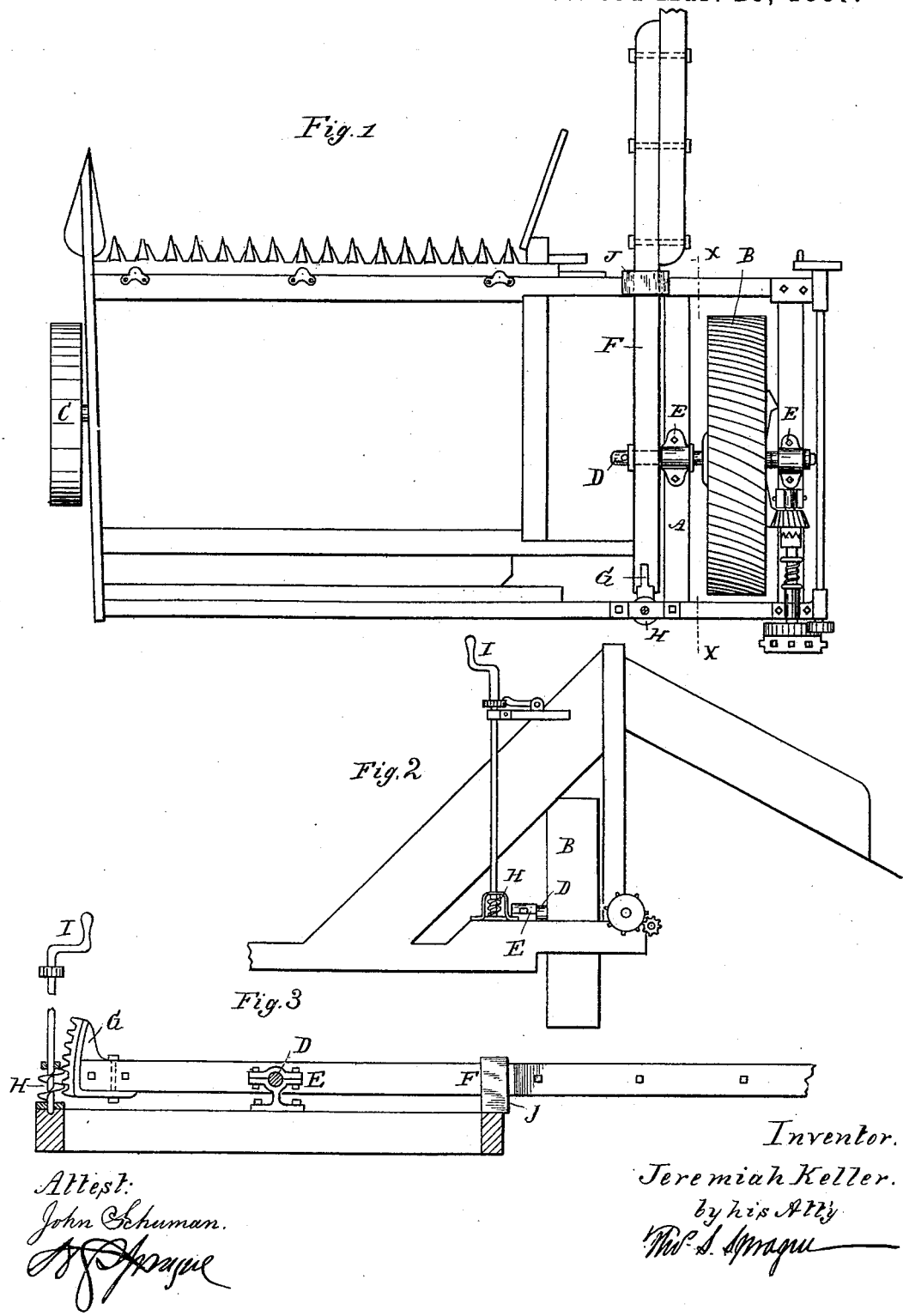
Attest:
John Schuman.
Inventor.
Jeremiah Keller.
by his Atty

United States Patent Office.

JEREMIAH KELLER, OF SANDUSKY, OHIO, ASSIGNOR TO OTTO KROMER, OF SAME PLACE.

TILTING DEVICE FOR HARVESTERS.

SPECIFICATION forming part of Letters Patent No. 360,226, dated March 29, 1887.

Application filed January 14, 1886. Serial No. 188,487. (No model.)

*To all whom it may concern:*

Be it known that I, JEREMIAH KELLER, of Sandusky, in the county of Erie and State of Ohio, have invented new and useful Improvements in Tilting Devices for Harvesters; and I do hereby declare that the following is a full, clear, and exact description thereof, reference being had to the accompanying drawings, which form a part of this specification.

This invention relates to a new and useful improvement in a tilting device for harvesters and harvester-binders; and the invention consists in the construction and arrangement of the parts, all as hereinafter described and claimed.

In the drawings which accompany this specification, Figure 1 is a plan showing my improvement applied to a harvester. Fig. 2 is a rear elevation thereof. Fig. 3 is a vertical section on line $x$ $x$ in Fig. 1.

In the drawings, A is the harvester-platform; B, is the main or drive wheel; C, is the grain-wheel; D, is the axle of the main wheel, E are the axle-boxes, and F is the pole to which the draft is applied, all these parts being constructed and arranged in a known manner, except as hereinafter specified.

The pole F is pivotally secured to the axle in any suitable manner, and to its rear end is secured a toothed segment-rack, G, which meshes with a worm, H, secured to the harvester-frame near the rear end of the pole. The worm H is provided with a staff and handle, I, for turning it, and with a device for locking it in position when adjusted.

In practice the above-described parts are so arranged that the driver on his seat can, by turning the handle I in one direction or another, raise or depress the rear end of the harvester-frame in its relation to the rear end of the pole, and as the latter necessarily maintains itself in the line of draft, the result will be a tilting of the harvester forward or backward, according to the direction in which the lever has been turned, thus raising or lowering the cutting apparatus to any desired distance from the ground.

To relieve the pivot of the pole from any injurious strain in turning the machine, and to prevent the worm and gear from binding, I preferably pass the forward end of the pole through a vertical slot in a guide or stirrup, J, which permits the required degree of tilting and serves as a stop to prevent the disengagement of the worm. Instead of the stirrup shown, any other contrivance of a similar nature for guiding the pole in its vertical adjustment may be used.

The advantages I claim for my device are that its few parts are not susceptible to any lost motion, that it requires but little power, is simple, and not liable to great wear or tear. Although my device may be modified within the spirit of my invention, which consists in applying the draft directly to the axle of the supporting-wheels by means of a pole pivoted thereon, in combination with a rack and worm for tilting, I prefer the construction shown and described as regards the relative position and arrangement of the worm and rack.

What I claim as my invention is—

1. In a tilting device for harvesters, a draft-pole pivoted to the axle of the main wheel in the line of draft, with its rear end extended beyond its pivotal point and having a vertically-adjustable connection with the rear of the harvester-frame, substantially as and for the purpose described.

2. In a tilting device for harvesters, a draft-pole pivotally secured on the axle of the supporting-wheel in the line of draft, and a rack and worm for tilting the harvester-frame in relation to the draft-pole, substantially as described.

3. In a tilting device for harvesters, the draft-pole F, pivotally secured on the axle of the supporting-wheel, the segmental rack G, secured to the end of the draft-pole, and the worm H, secured to the rear of the harvester-frame and provided with an operating-lever, all arranged and operating together, substantially as described.

4. In combination, the draft-pole F, pivotally secured on the axle of the supporting-wheel, the segment-rack G, secured to the end of the pole, the worm-lever H and lever I, secured to the harvester-frame in rear of the pole, and the pole-guide J, all arranged and operating substantially as described.

JEREMIAH KELLER.

Witnesses:
F. ERCKESSER,
H. FREY.